United States Patent Office 3,428,026
Patented Feb. 18, 1969

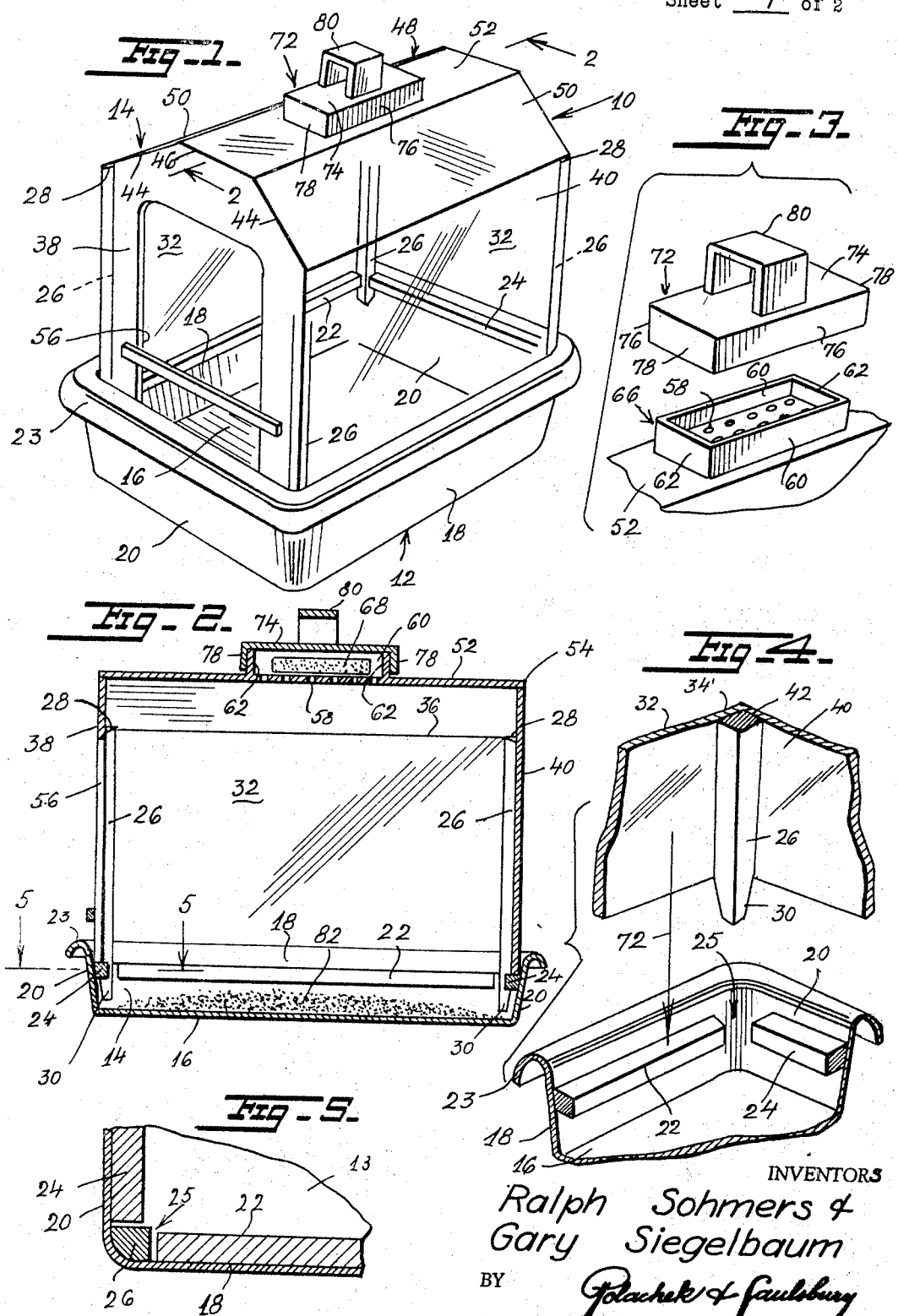

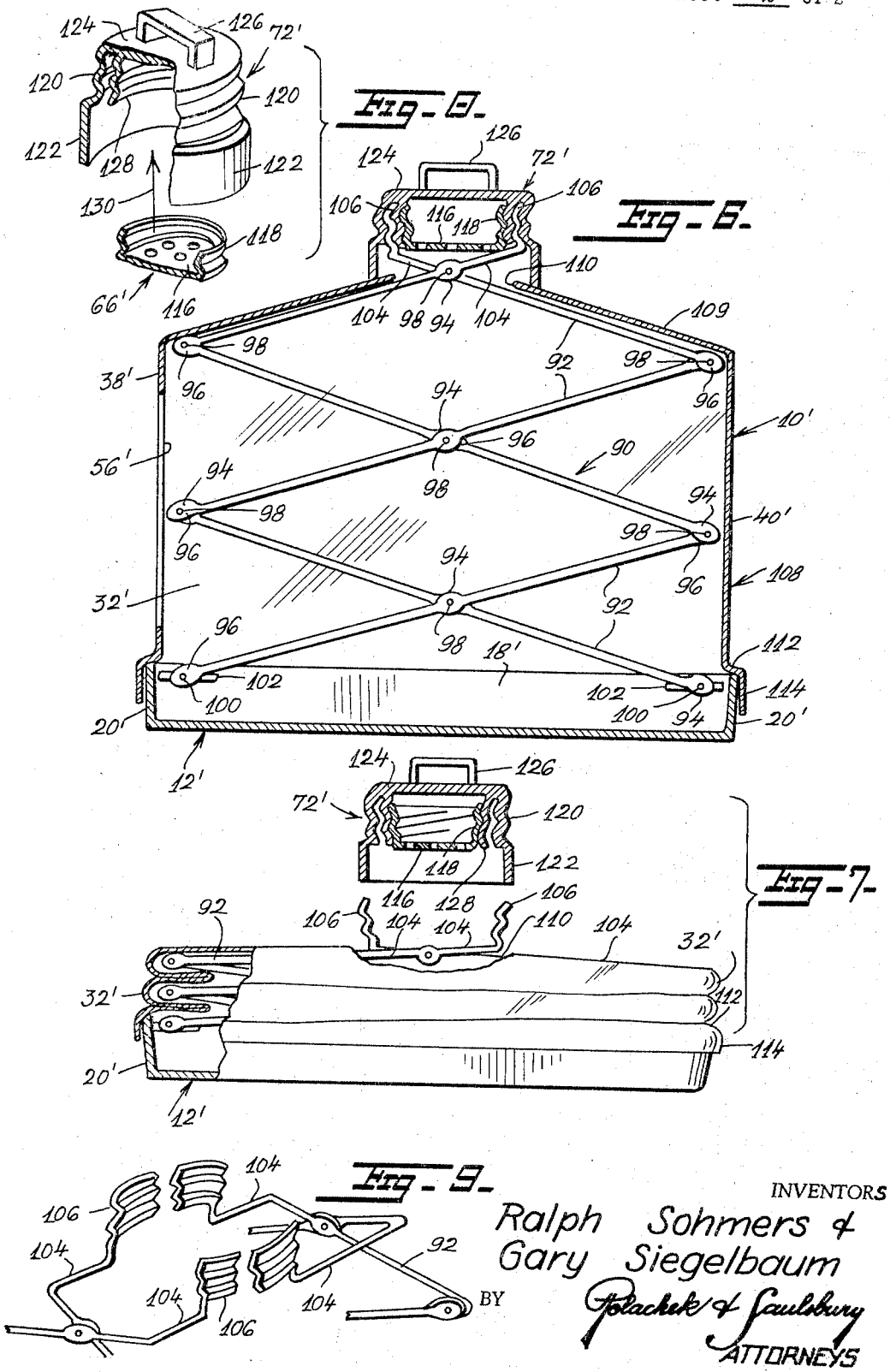

3,428,026
FUMIGATED PET HOUSE
Ralph Sohmers, 2536 Colden Ave., Bronx, N.Y. 10469,
and Gary Siegelbaum, 1110 Wyatt St., Bronx, N.Y.
10460
Filed Feb. 14, 1967, Ser. No. 616,038
U.S. Cl. 119—19                              3 Claims
Int. Cl. A01k 1/02

ABSTRACT OF THE DISCLOSURE

A pet house for cats and other pets, rectangular in plan, having a disk-shaped shallow pan-like base or foundation supporting upstanding sides, front and rear walls and a gabled shaped roof. An entrance opening is formed in the front wall, and a deodorant tray is mounted on the roof, communicating with the interior of the house. In a modified form, the walls are collapsible.

---

An important object of the present invention is to provide a house for pets such as cats and the like having ready means of ingress and egress.

Another object of the invention is to provide a pet house of this kind that is transparent and sanitary.

Yet another object is to provide a pet house with novel means for supporting a deodorant for fumigating the interior of the house.

Brief summary of the invention

A house for pets such as cats having a shallow plastic base or foundation and having transparent plastic walls, one of the walls having an opening for the entrance and exit of the pets. A gabled roof supports the transparent plastic tray for holding a supply of deodorant, the tray communicating with the interior of the house and having a handle for transporting the house.

Brief description of several views of drawings

FIG. 1 is a front perspective view of a pet housing embodying one form of the invention.

FIG. 2 is a vertical sectional view taken on the plane of the line 2—2 of FIG. 1, a supply bedding being shown on the base or foundation.

FIG. 3 is a disassembled perspective view of the deodorant tray on the roof of the housing, with removable cover therefor.

FIG. 4 is a disassembled perspective view showing a corner of the house.

FIG. 5 is an enlarged horizontal sectional view taken on the plane of the line 5—5 of FIG. 2.

FIG. 6 is a view similar to FIG. 2 of a pet house embodying a modified form of the invention in expanded condition, on a larger scale.

FIG. 7 is a side elevational view of the pet house of FIG. 6 in collapsed condition, parts being shown broken away and parts being shown detached.

FIG. 8 is a disassembled perspective view of the deodorant tray of FIG. 6, parts being shown broken away.

FIG. 9 is a spread perspective view of the top of the collapsible frame, parts being shown broken away.

Detailed description of drawings

Referring now in detail to the various views of the drawings, in FIG. 1 there is shown a pet house embodying one form of the invention designated generally at 10. The pet house 10 is rectangular in plan, consisting of a shallow pan-like base or foundation 12 and a box-like superstructure 14 supported on the base or foundation. The base or foundation 12 is preferably formed of opaque plastic material which may be of any light color, and the superstructure 14 is formed of rigid transparent plastic sheet material.

The base or foundation 12 has a solid bottom wall 16 and side and end walls 18 and 20, respectively, tapering upwardly and outwardly from the bottom wall. A continuous curved flange 23 extends around and overhangs the walls. The walls may be light in color or decorated to simulate marble if desired. Elongated solid rails 22 of suitable plastic material, square in cross-section, extend along the interior of the side walls 18, 18 of the base and similar shorter rails 24, 24 extend along the interior of the end walls 20, 20 thereof. The rails are parallel with the top ends of the side and end walls and are in horizontal alignment, but the adjacent ends thereof are spaced from each other as indicated at 25. The superstructure 14 comprises transparent solid plastic posts 26, square in cross-section, extending upwardly from each corner of the base. The posts have downwardly and outwardly slanting top edges 28 and tapered pointed bottom ends 30 projecting into the spaces 25 between the ends of the rails and inerlocking with said ends.

Upstanding transparent plastic side walls 32, 32 are supported on the side rails 22 and are secured to the outer surface of the corner posts 26 by adhesive 34. The side walls have straight flat top edges 36, 36. Upstanding transparent plastic front and rear walls 38 and 40, respectively, are supported on the end rails 24, 24, the side end edges thereof being secured to the other outer surfaces of the posts 26 by adhesive 42. The front wall 38 is formed with an entrance opening 56 for the pet to enter the house. The opening is rectangular in shape and extends from a point remote from the roof to and intersecting the bottom end edge of the front wall. The top edges of the side walls 32 are flat and straight extending from the front wall to the rear wall, while the top edges of the front wall 38 and rear wall 40 are formed with opposed flat upwardly slanting edges 44, 44 and with straight flat upper edges 46 joining the slanting edges.

A roof indicated generally at 46 is supported on the top edges of the side, front and rear walls and the slanting top edges 28 of the corner posts 26. The roof 48 consists of a pair of opposed upwardly slanting top wall portions 50, 50 supporting on the slanting top edges 44 of the front and rear walls 38 and 40, respectively. The top edges of the slanting top portions 50, 50 are joined by a flat straight top wall portion 52, the ends of which seat on the top straight flat edges 46 of the front and rear walls 38 and 40, respectively, and are secured thereto by adhesive 54.

An important feature of the present invention is means for fumigating the interior of the pet house 10. For this purpose, the topmost flat roof wall portion 52 is formed with a plurality of closely spaced holes 58 arranged over a rectangular shaped area midway the ends of the portion 52. A rectangular shaped frame consisting of side walls 60, 60 and end walls 62 62, joining the side walls, is mounted fixedly over the rectangular area formed with the holes 58. The frame is open at the top and the perforated area of the top wall portion 52 serves as the bottom, so that said perforated bottom and side and end walls 60 and 62, respectively, constitute a tray 66 adapted to receive and support a deodorant, such as the cake of deodorant 68 shown in FIG. 2. The fumes from the cake 68 of deodorant escape through the holes 58 and penetrate the interior of the house to fumigate the interior thereof. A removable cover 72 of similar plastic material is preferably provided for the tray. The cover has a top wall 74, side walls 76, 76 and end walls 78, 78 being open at the bottom. The cover is of sufficient size to fit snugly over the tray as shown in FIGS. 1 and 2. An inverted U-shaped plastic handle 80 is provided for the cover.

The bottom wall 16 of the base 12 is adapted to support a supply of bedding 82 as shown in FIG. 2 for use by the pet in the house 10. The opening 56 in the front wall 38 is sfficiently large to permit such bedding to be installed.

In assembling the house 10, the superstructure 14 constitutes a unit and the base 12 constitutes another unit so that the superstructure may be dropped over and into the top of the base as indicated by the arrow 72 in FIG. 4 whereby the bottom tapered ends 30 of the posts 26 project into and through the spaces 25 at the corners of the base and interlock with the ends of the rails 22 and 24, to hold the units in assembled condition.

The pet may readily enter the entrance opening 56 in the front wall 38 and the interior of the house is effectively fumigated by the cake of deodorant 68 in the tray 66.

In FIGS. 6 to 8, inclusive, a pet house 10′ is shown embodying a modified form of the invention. The house 10′ comprises an articulated frame 90 in the form of a lazy tong construction supported on each side wall 18′ of the base 12′. Each frame 90 is composed of a series of elongated tongs or round rods 92 crossing each other midway their ends and flattened at the points of crossing as indicated at 94, and flattened at their ends as indicated at 96, the ends overlapping. The flattened portions have aligned holes to receive pivot pins 98 pivotally connecting the tongs at such points. The tongs at one end of the frame, the bottom end as viewed in FIG. 6, have one end free and flattened carrying a pin 100 radially thereof. The pin 100 extend through short closed slots 102 formed in the side walls 18′ of the base 12′ adjacent the end walls 20′ thereof, the pins adapted to slide in the slots to permit extension and contraction of the frames 90. The pairs of tongs 92 at the other end of the frames, the top end, are formed with short extensions 104 which extensions 104 continue into screw threaded arcuate shaped screw threaded flange segments 106 extending at right angles to the plane of the extensions 104 (see FIG. 9).

In accordance with this form of the invention, a collapsible and flexible solid metal cover 108 is placed over the frames 90. The body of the cover is rectangular in cross-section with side walls 32′, a front end wall 38′ with an entrance opening 56′ therein, a rear end wall 40′ and an upwardly and inwardly tapered top wall 109 formed with a narrow central opening 110. An elongated opening 56′ is cut in the front end wall 38′ to serve as an entrance for a pet. The other bottom end of the body of the cover 108 is open and formed with a radial shoulder 112 therearound and with a downwardly extending flange 114 in a plane parallel to the plane of the body of the base 12′. The shoulder 12 seats on the top edges of the side and end walls 18′ and 20′ of the base 12′ with the flange 114 overlapping the outer surfaces of said walls at the tops thereof. The frame 90 is thus tied to the base 12′ and is enclosed by the cover 108.

Novel apparatus is provided for fumigating the interior of the pet house 10′, which apparatus coacts with the threaded flange segments 106 of the extensions 104 of the frame 90. The extensions 104 of the topmost pair of tongs 92 project through the opening 110 outwardly of the top wall 109. A tray 66′ and cover 72′ assembly is adapted to be supported in threaded engagement on the projecting flange segments 106. This assembly includes a circular tray 66′ composed of a circular perforated plate 116 with an upstanding flange 118 formed with screw threads. The cover 72′ has a hollow cylindrical body formed at one end with a screw threaded portion 120 and at its other end with a flared skirt portion 122 and being open at said other end. The diameter of the threaded portion 120 is smaller than the diameter of the flared skirt portion 122. The top of the body is closed with an integral top wall 124, which top wall is provided with an inverted U-shaped handle 126 on the top surface thereof.

Inside the body of the cover, depending from the top closure plate 124, there is another inner threaded portion 128 spaced from the outer threaded portion 120. The threads of said outer and inner portions run in the same direction as seen in FIG. 8, which direction is opposite to the direction of the thread on tray 66′ so that the flange 118 of said tray may be screw threaded onto the inner surface of the inner threaded portion 128 of the cover, and which direction is opposite to the direction of the threads on the flange segments 106 of the extensions 104 of the lazy tong frame 90 so that said flange segments may be screw threaded into the space between said outer and inner threaded portions as shown in FIG. 6. The pins 100 on the pin carrying free ends of the bottommost tongs 92 are inserted through the slots 102 in the side walls 18′ of the base 12′. The flanged end of the flexible metal cover 108 is placed over the top edges of the walls of the base 12′ and over the lazy tong frame 90, with the extensions 104 projecting outwardly of the opening 110 in the top of the cover.

In assembling, the lazy tong frame 90 is connected to the base 12′ by inserting the pins 100 carried by the lowermost tongs 92 into and through the slots 102 in the walls 18′ of the base 12′. The cover 108 is then placed over the frame 20 while the frame is extended, projecting the extensions 104 with flange segments 106 through the opening 110 in the cover 108 and slipping the flange 114 of the cover over the top edges of the side and end walls of the base 12′.

The tray 66′ and its cover 72′ is assembled by inserting the flange 118 of the tray upwardly into the body of the cover 72′ in the direction of the arrow 130 in FIG. 8, a cake of deodorant having first been placed on plate 116, and threading the flange 118 thereof onto the inner surface of the inner threaded portion 128 of the cover 72′ to the position shown in FIG. 6.

The assembled tray 66′ and cover 72′ as a unit is then threaded onto the flange segments 106 of the extensions 104 by inserting the free ends of the terminals in the space between the outer and inner threaded portions 120 and 128, respectively, and turning said unit on said inserted ends of the flange segments until the bottom edge of the skirt portion 122 of the cover 72′ seats on the top wall 109 of the cover 108, sealing said opening 110 in the cover as shown in FIG. 6.

In operation, when the house 10′ is extended as seen in FIG. 6, the pet can readily enter through the entrance opening 56′. The fumes from the cake of deodorant will pass through the perforations in plate 116 to the interior of the house, fumigating the air within and the ambient air outside of the house.

The house can readily be collapsed by manually pressing down on the cover 72′ thereby forcing the tongs 92 downwardly, their pivotal connections permitting this operation, the prongs carrying the cover 108 therealong to the collapsed condition shown in FIG. 7.

While we have illustrated and described the preferred embodiments of our invention, it is to be understood that we do not limit ourselves to the precise construction herein disclosed and that various changes and modifications may be made within the scope of the invention.

We claim:

1. A fumigated pet house having a shallow pan-like base, a superstructure removably mounted on said base, said superstructure including side walls, a front wall with an entrance opening therein, a rear wall and a roof, the bottom of the superstructure being open to expose the pan-like base to the space within the superstructure, the base being formed of opaque plastic material, the superstructure being formed of transparent plastic material and the roof being gabled and formed with a central straight portion and fumigating means supported on said superstructure to fumigate the interior of the house, the base and superstructure being rectangular in plan, the base having upstanding side and front and rear end walls and being open at the top, said superstructure including posts extending upwardly from the corners of the base, rails along the inner surfaces of the side walls and front and rear end walls of the base, adjacent the top edges thereof, the side walls of the superstructure resting on the rails on the side walls of the base, the end walls of the superstructure resting on the rails on the end walls of the base, said side and end walls of the superstructure secured at their side edges to the corner posts, the adjacent ends of the side and end walls on the base being spaced from each other, the bottom of the corner posts extending below the side and end walls of the superstructure into the space between the side and end rails in interlocking engagement with said ends of the side and end rails.

2. A fumigated pet house having a rectangular shallow pan-like base with bottom, side and end walls, said side walls having closed slots adjacent the end walls, a lazy tong frame structure having pivoted tong members connected at one end to said base, said connection including radial pins carried on the free ends of the endmost tongs, said pins slidably engaged in the slots in the side walls of the base, a flexible metal cover supported over the tongs of said frame structure, said cover having side walls, front and rear end walls and a top wall, said cover being open at the bottom, said front end wall having an entrance opening therein, said top wall having a central opening therein, extensions on the topmost tongs of the tong frame structure, screw threaded flange segments carried on the ends of said extensions above the opening in the top wall of the cover, a flange on the open bottom end of the cover overlapping the top edges of the side and end walls of the base, and a perforated tray and cover assembly removably mounted on the flange segments of the tong frame structure.

3. A fumigated pet house as defined in claim 2 wherein the perforated tray and cover assembly includes a circular perforated plate, an upstanding screw threaded flange along the periphery of the plate, a hollow cylindrical body having a screw threaded end and a plain end, the diameter of the screw threaded end being smaller than the diameter of the plain end, a wall closing one end of the body, a handle on said closure wall, and a cylindrical screw threaded wall portion depending from said closure wall, spaced from said screw threaded end of the body, the space between the screw threaded end of the body and the screw threaded depending wall portion adapted to receive threadedly the flange of the tray for joining the tray and cover in operative position.

References Cited

UNITED STATES PATENTS

| | | | |
|---|---|---|---|
| 1,384,866 | 7/1921 | Silvers | 119—19 |
| 1,754,590 | 4/1930 | Allen | 46—19 |
| 2,573,548 | 10/1951 | Cunningham | 220—87 |
| 2,611,338 | 9/1952 | Yellin | 119—17 |
| 2,653,826 | 9/1953 | Yen-Shen Lu | 150—49 X |
| 2,802,590 | 8/1957 | Tupper | 220—87 X |
| 2,914,022 | 11/1959 | Hinton | 119—17 |
| 3,107,712 | 10/1963 | Bergeretto | 150—49 X |
| 3,195,505 | 7/1965 | Hauth et al. | 119—19 X |
| 3,308,789 | 3/1967 | Artig | 119—19 |
| 3,346,140 | 10/1967 | Mele | 220—87 |

ALDRICH F. MEDBERY, *Primary Examiner.*

U.S. Cl. X.R.

119—17, 160